(12) United States Patent
Lim

(10) Patent No.: US 8,254,046 B2
(45) Date of Patent: Aug. 28, 2012

(54) CAMERA MODULE WITH AUTOFOCUS FUNCTION

(75) Inventor: Jang-Ho Lim, Yongin-si (KR)

(73) Assignee: McNex Co., Ltd., Seoul (KR)

( * ) Notice: Subject to any disclaimer, the term of this patent is extended or adjusted under 35 U.S.C. 154(b) by 0 days.

(21) Appl. No.: 12/903,597

(22) Filed: Oct. 13, 2010

(65) Prior Publication Data

US 2011/0116180 A1   May 19, 2011

(30) Foreign Application Priority Data

Nov. 19, 2009 (KR) .................. 10-2009-0112206
Oct. 5, 2010 (KR) .................. 10-2010-0096667

(51) Int. Cl.
*G02B 7/02* (2006.01)

(52) U.S. Cl. .................. 359/824; 359/822; 359/823

(58) Field of Classification Search ........... 359/822–824
See application file for complete search history.

(56) References Cited

U.S. PATENT DOCUMENTS

| | | | | |
|---|---|---|---|---|
| 5,892,629 | A * | 4/1999 | Nishihara et al. | 359/814 |
| 7,990,635 | B2 * | 8/2011 | Okabe et al. | 359/824 |
| 2003/0123161 | A1 * | 7/2003 | Ohno | 359/824 |
| 2008/0025164 | A1 | 1/2008 | Sata et al. | |
| 2008/0159729 | A1 * | 7/2008 | Hong et al. | 396/133 |
| 2011/0051265 | A1 * | 3/2011 | Lee | 359/824 |

FOREIGN PATENT DOCUMENTS

| | | |
|---|---|---|
| JP | 2006-017924 | 1/2006 |
| JP | 2006-293244 | 10/2006 |
| JP | 2008-032768 A | 2/2008 |
| KR | 10-2005-0105408 | 11/2005 |
| KR | 10-2009-0097096 | 9/2009 |
| WO | WO 2009110257 A1 * | 9/2009 |
| WO | WO 2009/128668 A2 | 10/2009 |
| WO | WO 2009128668 A2 * | 10/2009 |

OTHER PUBLICATIONS

Chinese Office Action issued on Apr. 1, 2012 in counterpart Chinese Application No. CN 201010550832.2 (3 pages) and English language translation (4 pages).

* cited by examiner

*Primary Examiner* — Ricky Mack
*Assistant Examiner* — Mahidere Sahle
(74) *Attorney, Agent, or Firm* — NSIP Law

(57) ABSTRACT

Provided is a camera module that includes a lens section comprising at least one lens, a coil section fixed to the lens section and comprising wiring terminals, a magnet section comprising a permanent magnet, an inner yoke, and an outer yoke, wherein the inner yoke and the outer yoke induce a magnetic force line to pass through the coil section, and a terminal extension section comprising a first terminal and a second terminal that electrically extend from the wiring terminals of the coil section to the outside of the camera module and surround the magnet section so that the first terminal and the second terminal are externally exposed.

15 Claims, 5 Drawing Sheets

CAMERA MODULE WITH AUTOFOCUS FUNCTION

CROSS-REFERENCE TO RELATED APPLICATION

This application claims the benefit under 35 U.S.C. §119 (a) of Korean Patent Application Nos. 10-2009-0112206, filed on Nov. 19, 2009, and 10-2010-0096667, filed on Oct. 5, 2010, the disclosures of which are incorporated herein by references for all purposes.

BACKGROUND

1. Field of the Invention

The present invention relates to a camera module, and more particularly, to a camera module that is mounted in a terminal and has a function of automatically focusing a subject.

2. Description of the Related Art

A camera module mounted in a small-sized terminal such as digital cameras or portable phones employs an image sensor of a charge coupled apparatus (CCD) type or a complementary metal oxide semiconductor (CMOS) type. The camera module converts an optical signal into an electrical signal to form an image.

The camera module has an autofocus function of automatically focusing a subject. To this end, the camera module with the autofocus function includes an autofocus adjusting apparatus that varies a position of the lens with respect to the image sensor.

The conventional autofocus adjusting apparatus moves the lens in a straight line in an optical axis direction such that rotation movement of a motor is converted to straight line movement by a conversion mechanism such as a gear. However, since the autofocus adjusting apparatus uses the gear, it is difficult to precisely adjust the focus. Further, due to the space occupied by the motor and the gear, there is a limit to reducing the size of the terminal.

In order to resolve the above problems, an autofocus adjusting apparatus of a voice coil motor (VCM) type has been suggested. In the autofocus adjusting apparatus of the VCM type, a permanent magnet that generates magnetic force is disposed to face a coil to which an electric current is supplied, and a position of the lens is varied by Lorentz force generated vertically to a magnetic field and an electric current.

In the autofocus adjusting apparatus of the VCM type, the coil is connected to a printed circuit board (PCB) so that an electric current can be supplied to the coil. To this end, wiring terminals of the coil are soldered to connection terminals of the PCB.

However, in the autofocus adjusting apparatus of the VCM type, there is a case where the focus of the lens should be precisely adjusted with respect to the PCB by zero adjustment. When the lens section having the lens rotates with respect to the PCB, the wiring terminals of the coil may not be connected to the connection terminals of the PCB depending on a rotation angle of the lens section. For this reason, the wiring terminals may not be soldered to the connection terminals.

The problem may be solved by increasing the length of the wiring terminals. However, in this case, the wiring terminals may unnecessarily remain lengthy after soldered to the connection terminals, leading to the problem on how to deal with the wiring terminals.

SUMMARY

The present invention is directed to a camera module with an autofocus function in which the wiring terminals of the coil section can be easily connected to the connection terminals of the PCB regardless of the position of the wiring terminals of the coil section when the lens section rotates with respect to the PCB for precise focus adjustment.

A first aspect of the present invention provides a camera module, including: a lens section comprising at least one lens; a coil section fixed to the lens section; and a magnet section comprising an inner yoke and an outer yoke, wherein the coil section is disposed between the inner yoke and the outer yoke, and the inner yoke and the outer yoke induce a magnetic force line to pass through the coil section.

The magnet section may further include a permanent magnet surrounding the lens section. The inner yoke may be fixed to one of two magnetic poles of the permanent magnet, and the outer yoke may be fixed to the other of the two magnetic poles of the permanent magnet.

The inner yoke may include a horizontal section that supports the permanent magnet and a vertical section that downward extends from the horizontal section, facing the coil section, and the outer yoke may include a horizontal section that supports the permanent magnet together with the horizontal section of the inner yoke and a vertical section that downward extends from the horizontal section, facing the coil section.

The camera module may further include a terminal extension section configured to electrically extend from a wiring terminal of the coil section to the outside of the camera module.

The camera module may further include a head that partially covers an upper end of the outer yoke and a base that partially covers a lower end of the outer yoke. The terminal extension section may be partially placed between a concave section between the head and the base.

A second aspect of the present invention provides a camera module, including: a lens section comprising at least one lens; a coil section fixed to the lens section and comprising wiring terminals; a magnet section generating a magnetic field acting on the coil section; a terminal extension section comprising a first terminal and a second terminal, wherein the first terminal and second terminal electrically extend from the wiring terminals of the coil section to the outside of the camera module and surrounding the magnet section so that the first terminal and the second terminal are externally exposed.

The terminal extension section may include a ring member electrically contacting the wiring terminals of the coil section, and a band member extending from the ring member and surround the magnet section. The first terminal and the second terminal may be formed along the ring member and the band member.

The ring member may have contact points contacting the wiring terminals of the coil section and be configured such that the first terminal extends from one of the contact points along one half of the ring member, and the second terminal extends from the other of the contact points along the other half of the ring member.

The camera module may further include a head that partially covers an upper end of the magnet section and a base that partially covers a lower end of the magnet section. The terminal extension section may be partially placed between a concave section between the head and the base.

The magnet section may include a permanent magnet, an inner yoke fixed to one of two magnetic poles of the permanent magnet, and an outer yoke fixed to the other of the two magnetic poles of the permanent magnet. The coil section may be interposed between the inner yoke and the outer yoke.

The camera module may further include a printed circuit board (PCB) having contact points that extend from the PCB to electrically be connected with the first terminal and the second terminal formed in the terminal extension section.

A third aspect of the present invention provides a camera module with an autofocus function, including: a lens section including at least one lens, a coil section fixed to the lens section, a magnet section disposed such that a magnetic field acts on the coil section and supported by a base, a spring disposed between the lens section and the base, a holder screw-coupled with the base for precise focus adjustment of the lens section, a terminal extension section including a first terminal and a second terminal that are connected with wiring terminals of the coil section, respectively and extends to the outside, and a printed circuit board (PCB) fixed to the holder and having connection terminals that extend to be electrically connected with the first and second terminals.

The terminal extension section may be formed to surround an outer circumferential surface of the magnet section, and the first and second terminals may be formed on a surface of the terminal extension section to be externally exposed.

The terminal extension section may include a circular ring member disposed above the spring and coupled with the base and a band member formed integrally with the circular ring member and extending from the circular ring member to the outside and being bendable to surround the outer circumferential surface of the magnet section.

The band member may include an adhesive section fixed to the magnet section on a surface opposite to the surface on which the first and second terminals are formed.

The magnet section may include a permanent magnet of a ring shape surrounding the lens section, an inner yoke fixed to one of two magnetic poles of the permanent magnet and disposed inside the coil section, and an outer yoke fixed to the other of the two magnetic poles of the permanent magnet and disposed outside the coil section. The terminal extension section may be fixed to an outer circumferential surface of the outer yoke.

The camera module may further include a head disposed above the outer yoke to partially cover the outer circumferential surface of the outer yoke. The base may partially cover the outer circumferential surface of the outer yoke below the outer yoke and be apart from the head, and the terminal extension section may be placed on a concave section between the head and the base.

The outer yoke may be fixed to an upper end of the permanent magnet, bent facing the outside of the coil section while surrounding the outside of the permanent magnet, and fixed to the base, and the inner yoke may be fixed to a lower end of the permanent magnet and bent facing the inside of the coil section.

Additional aspects of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF EMBODIMENTS

Figure 1:
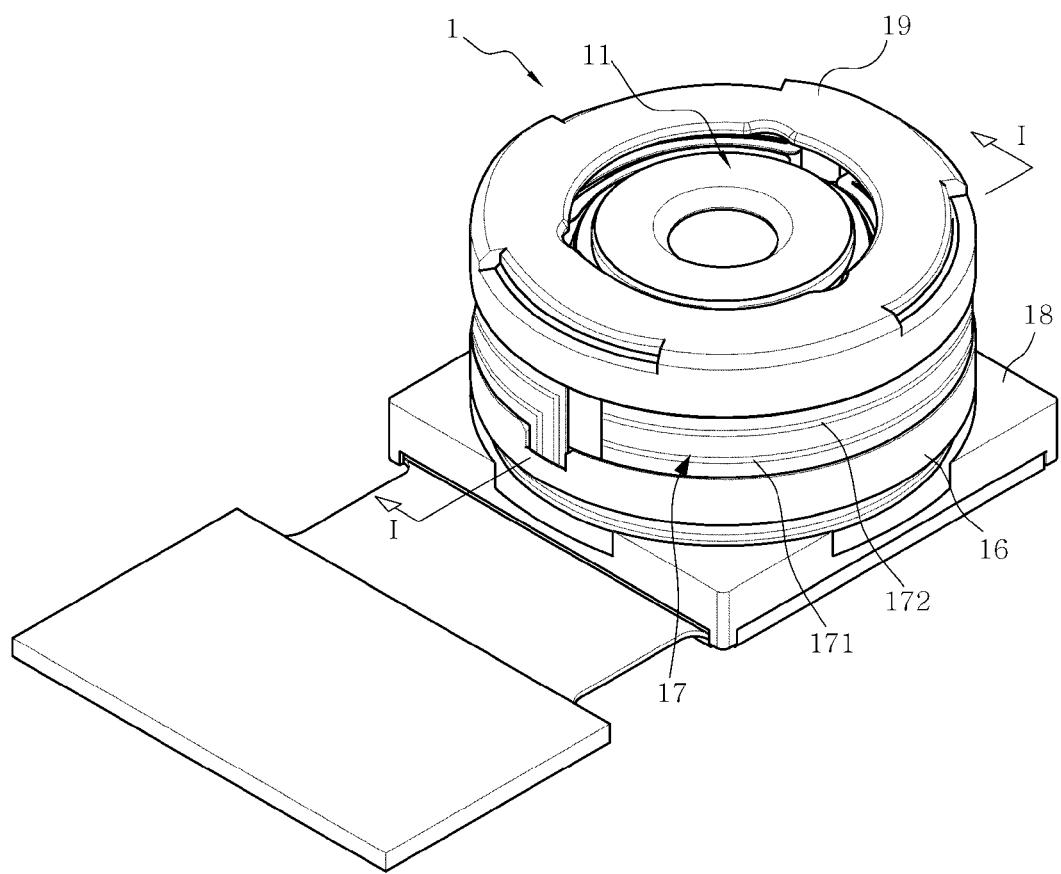
FIG. 1 is a perspective view illustrating a camera module according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 2:
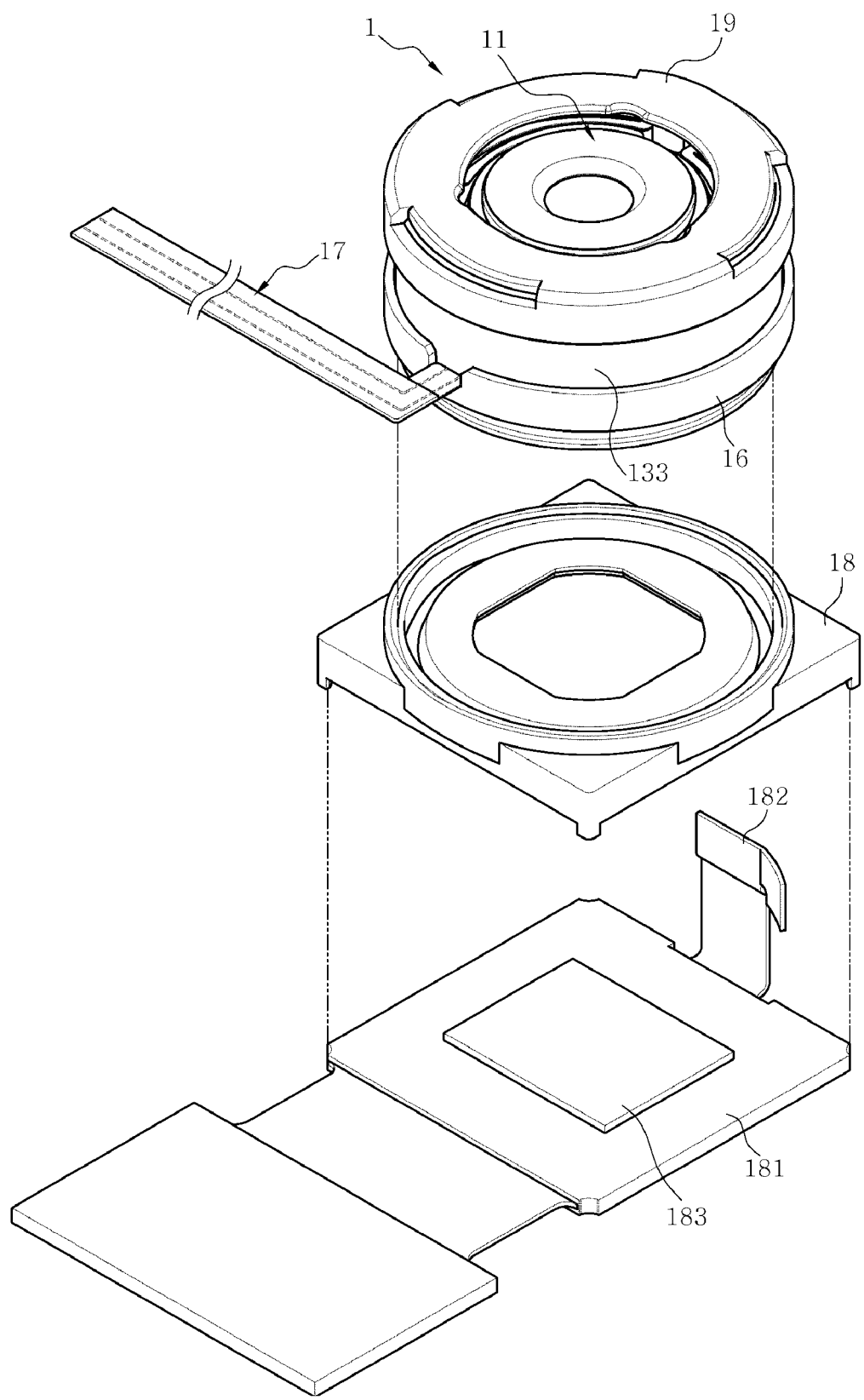
FIG. 2 is a perspective view illustrating a state in which a terminal extension section is unbound from an outer circumferential surface of a magnet section.
Figure 3:
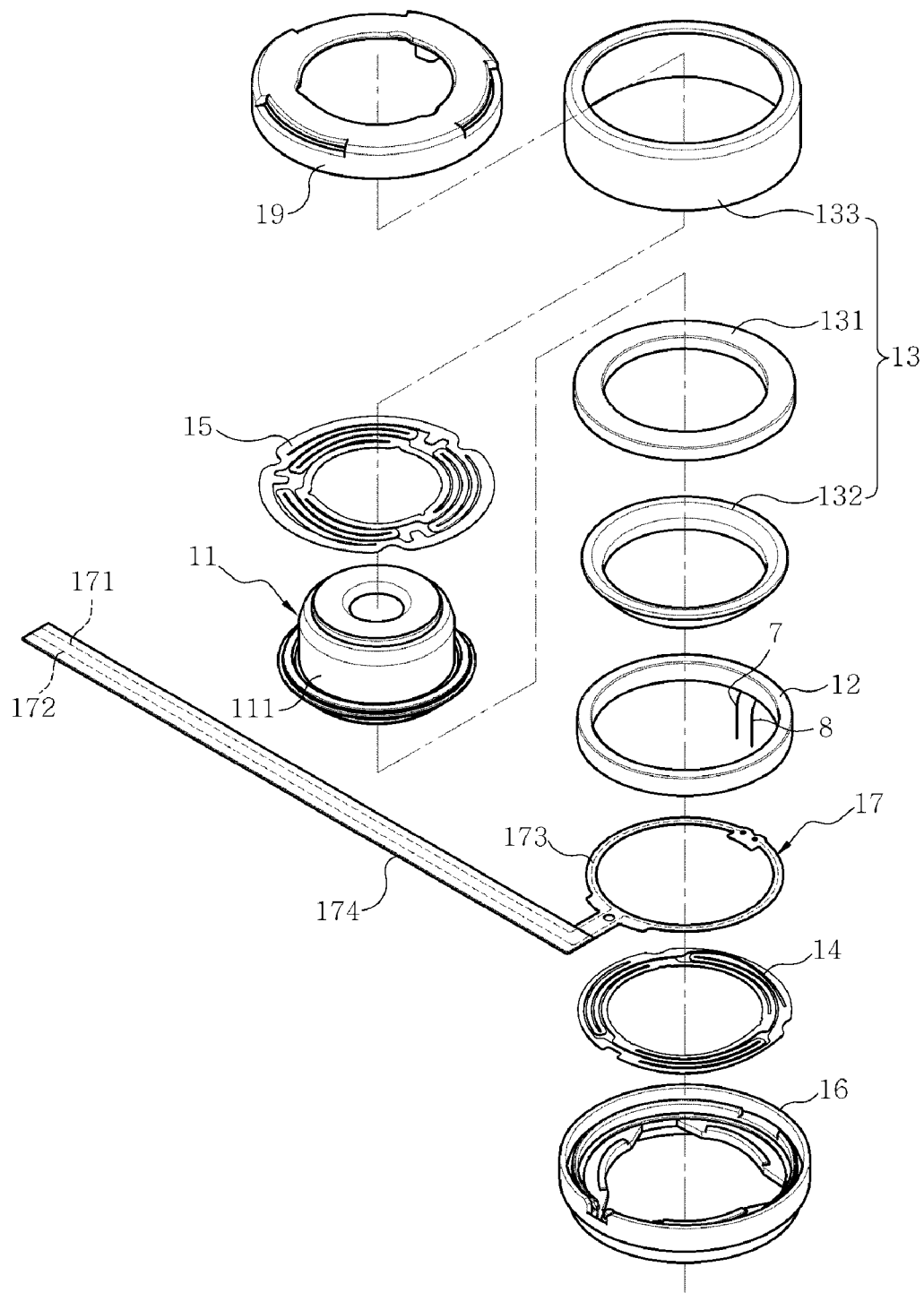
FIG. 3 is an exploded perspective view illustrating the camera module of FIG. 1.
Figure 4:
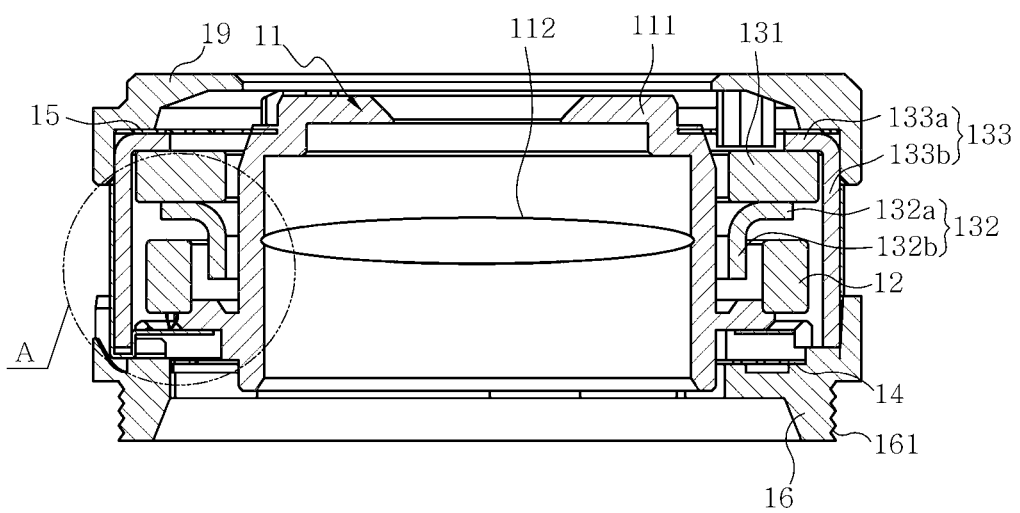
FIG. 4 is a cross-sectional view taken along line I-I of FIG. 1.
Figure 5:
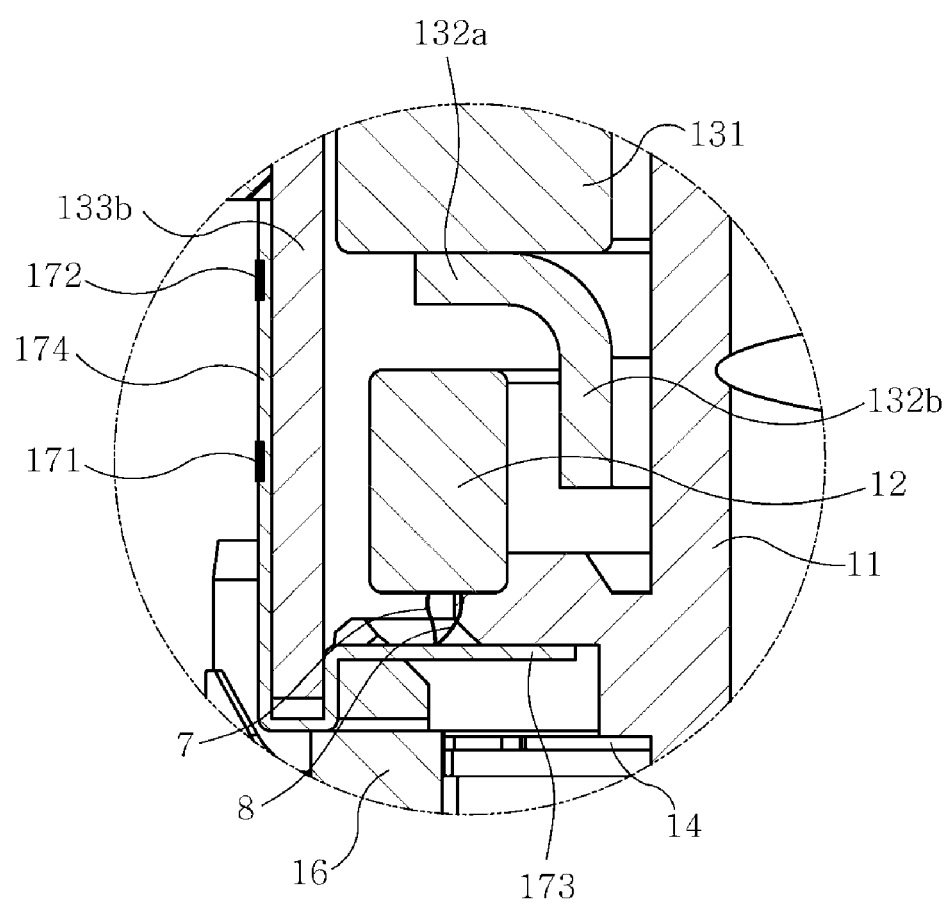
FIG. 5 is an enlarged cross-sectional view of an A region of FIG. 4.

FIG. 1 is a perspective view illustrating a camera module according to an exemplary embodiment of the present invention. FIG. 2 is a perspective view illustrating a state in which a terminal extension section is unbound from an outer circumferential surface of a magnet section. FIG. 3 is an exploded perspective view illustrating the camera module of FIG. 1. FIG. 4 is a cross-sectional view taken along line I-I of FIG. 1. FIG. 5 is an enlarged cross-sectional view of an A region of FIG. 4.

Referring to FIGS. 1 to 5, a camera module 1 according to an exemplary embodiment includes a lens section 11, a coil section 12, a magnet section 13, a spring 14, a base 16, and a terminal extension section 17.

The lens section 11 includes at least one lens 112. The lens 112 functions to form an optical image of a subject. The lens section 11 includes a barrel 111 that accommodates the lens 112. An upper portion of the barrel 111 is opened so that light can enter the lens 112. A lower portion of the barrel 111 is opened so that light passing through the lens 112 can be transmitted to an image sensor 183 installed below the lens 113.

The coil section 12 surrounds the lens section 11 and is fixed to the lens section 11, for example, by an adhesive. The coil section 12 is disposed within a magnetic field generated by the magnet section 13. The coil section 12 moves in a straight line in an optical axis direction by Lorentz force when an electric current is supplied from a PCB 181. The lens section 11 fixed to the coil section 12 moves in a straight line in an optical axis direction. Thus, a position of the lens 112 varies with respect to the image sensor 183, so that a focus can be automatically adjusted.

The magnet section 13 is disposed so that the magnetic field can act on the coil section 12. The magnet section 13 is supported by the base 16. The base 16 has a ring shape, and a male screw 161 is formed on an outer circumferential surface.

The spring 14 is disposed between the lens section 11 and the base 16 to elastically support the lens section 11 against the base 16. That is, when the lens section 11 moves in the optical axis by force applied to the lens section 11, the spring 14 is elastically transformed. When force applied to the lens section 11 is removed, resorting force is generated by the spring 14, and so the lens section 11 is returned to an original position by the restoring force. The spring 16 may be configured in the form of a leaf spring.

An upper spring 15 may be further disposed above the lens section 11. A head 19 may be disposed above the upper spring 15. The upper spring 15 is disposed between the head 19 and the lens section 11 to elastically support the lens section 11 against the head 19.

The base 16 is screw-coupled to a holder 18 fixed to the PCB, for example, by an adhesive. That is, the male screw 161 of the base 16 may be screw-coupled to a female screw of the holder 18. As the base 16 normally or reversely rotates in a state screw-coupled to the holder 18, the lens section 11 moves up or down. Through this process, the focus of the lens 112 can be precisely adjusted. The image sensor 183 is disposed on the PCB 181, and a through hole is formed in a center of the holder 18 to expose a top portion of the image sensor 183. The PCB 181 supplies a control current for focus adjustment of the lens 112 to the coil section 12. The image sensor 183 converts an optical image formed by the lens 112 to an electrical signal. The image sensor 183 may be of a CCD type or a CMOS type.

Since the base 16 constitutes an assembly together with the lens section 11 and is screw-coupled with the holder 18, precise focus adjustment can be performed. The state of the lens section 11 does not change after precise focus adjustment, and so precise focus adjustment can be easily performed. Further, since force is not applied to the springs 14 and 15 during the precise focus adjusting process, damage of the springs 14 and 15 can be reduced.

A first terminal 171 and a second terminal 172 to be connected with wiring terminals 7 and 8, respectively, are formed in the terminal extension section 17. The terminal extension section 17 is configured so that the first terminal 171 and the second terminal 172 can always contact connection terminals 182 of the PCB 181 even when the base 16 rotates with respect to the holder 18. The connection terminals 182 includes contact points, which are to be connected with the first terminal 171 and the second terminal 172, respectively, formed on a surface facing the first terminal 171 and the second terminal 172.

That is, the focus is precisely adjusted by normally or reversely rotating the base 16 against the holder 18, and in this state, the first and second terminals 171 and 172 connected to the wiring terminals 7 and 8 are connected to and fixed to the connection terminals 182 of the PCB 181. That is, in the process of performing precise focus adjustment by normally or reversely rotating the base 16 against the holder 18, regardless of positions of the wiring terminals 7 and 8 of the coil section 12, the first and second terminals 171 and 172 connected to the wiring terminals 7 and 8 always contact the connection terminals 182 of the PCB 181. Thus, since the first and second terminals 171 and 172 are connected to and fixed to the connection terminals 182 of the PCB 181 when the lens is focused, the assembly process is simplified.

The first and second terminals 171 and 172 may be formed on one surface of the terminal extension section 17. The terminal extension section 17 may have a structure of surrounding an outer circumferential surface of the magnet section 13 so that the first and second terminals 171 and 172 can be externally exposed.

The terminal extension section 17 may include a circular ring member 173 and a band member 174. The first and second terminals 171 and 172 may be formed throughout the circular ring member 173 and the band member 174. The circular ring member 173 is disposed above the spring 14 and coupled with the base 16. Contact points respectively connected with the first and second terminals 171 and 172 are formed in the circular ring member 173, and the contact points are respectively connected with the wiring terminals 7 and 8 of the coil section 12. For example, as shown in FIG. 3, the first terminal 171 may extend along one half of the circular ring member 173 starting from the contact point, which is formed in the circular ring member to be connected with the wiring terminal 7, to the band member 174, and the second terminal 172 may extend along the other half of the circular ring member 173 starting from a contact point, which is formed in the circular ring member to be connected with the wiring terminal 8, to the band member 174.

The band member 174 is formed integrally with the circular ring member 173 and extends from the circular ring member 173 to the outside of the base 16. The band member 174 may be made of a soft flexible material. Thus, the band member 174 can be bent to surround the outer circumferential surface of the magnet section 13. The band section 174 may include an adhesive section on a surface opposite to a surface on which the first and second terminals 171 and 172 are formed. The adhesive section may be made of a material having adhesion and a both-sided adhesive tape. The band section 174 is fixed to the magnet section 13 through the adhesive section.

When the band member 174 surrounds the outer circumferential surface of the magnet section 13 so that one surface of the band member 174 can be adhesive to the outer circumferential surface of the magnet section 13 by the adhesive section, the first and second terminals 171 and 172 of the band member 174 are externally exposed. Thus, the assembly process of the camera module 1 is simple, leading to improved productivity.

In a state in which the first and second terminals 171 and 172 of the band member 174 are disposed along the outer circumferential surface of the magnet section 13, the connection terminals 182 of the PCB 181 extend corresponding to the outer surface of the band member 174 to contact the first and second terminals 171 and 172. Even through the positions of the connection terminals 182 of the PCB 181 with respect to the magnet section 13 change according to the rotation position of the base 16 with respect to the holder 18, the connection terminals 182 can always contact the first and second terminals 171 and 172. Thus, when the base 16 rotates with respect to the holder 18, the wiring terminals 7 and 8 of the coil section 12 can be electrically connected with the connection terminals 182 of the PCB 181 regardless of the positions of the wiring terminals 7 and 8.

The magnet section 13 may include a permanent magnet 131, an inner yoke 132, and an outer yoke 133. The permanent magnet 131 may have a ring shape of surrounding the lens section 11. The inner yoke 132 is fixed to one of two magnetic poles of the permanent magnet 131, for example, an adhesive and disposed inside the coil section 12. The outer yoke 133 is fixed to the other of the two magnetic poles of the permanent magnet 131, for example, an adhesive and disposed outside the coil section 12.

For example, the permanent magnet may be configured such that an upper end and a lower end thereof have different magnetic poles from each other. The inner yoke 132 is fixed to the lower end of the permanent magnet 131 to have the same magnetic pole as the lower end of the permanent magnet 131. The inner yoke 132 may be formed to be bent downward facing the inside of the coil section 12. That is, the inner yoke 132 may include a horizontal section 132a that supports the permanent magnet 131 and a vertical section 132b that downward extends from the horizontal section 132a, facing the coil section 12.

The outer yoke 133 may be bent to surround the outside of the permanent magnet 131 and extends downward, and a lower end of the outer yoke 133 may be fixed to the base 16, for example, an adhesive. That is, the outer yoke 133 may include a horizontal section 133a that supports the permanent magnet 131 together with the inner yoke 132 and a vertical section 133b that downward extends from the horizontal section 133a, facing the coil section. Thus, since the outer yoke 133 covers the outer covering of the camera module 1 and prevents invasion of foreign substances, the outer yoke 133 has a function of a housing that covers the outer covering of the camera module 1 and protects the camera module 1. Thus, it is possible to reduce the size of the camera module 1.

The vertical section 132b of the inner yoke 132 that extends downward and the vertical section 133b of the outer yoke 133 that extends downward are disposed in parallel to face each other with the coil section 12 interposed therebetween. Thus, the inner yoke 132 and the outer yoke 133 induce the flow of the magnetic force line to be horizontally formed therebetween and pass through the coil section 12.

In the above-described structure of the magnet section 12, the band member 174 of the terminal extension section 17 may be fixed to the outer circumferential surface of the outer yoke 133. When a lower end of the outer yoke 133 is fixed to the inside of the base 16, the outer circumferential surface of the outer yoke 133 is concaved from the outer circumferential surface of the base 16. The terminal extension section 17 is fixed to the concave section, and thus the structure of the camera module 1 can be further compacted.

Above the outer yoke 133, the head 19 may be assembled to partially cover the outer circumferential surface of the outer yoke 133, and below the outer yoke 133, the base 16 may be assembled to partially cover the outer circumferential surface of the outer yoke 133. A lower end of the head 19 and an upper end of the base 16 are separated from each other to form a concave section therebetween. The terminal extension section 17 is placed on the concave section and fixed to the outer circumferential surface of the outer yoke 133. Thus, the structure of the camera module 1 is simple, and the size of the camera module 1 is reduced.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A camera module, comprising:
 a lens section comprising at least one lens;
 a coil section fixed to the lens section; and
 a magnet section comprising a permanent magnet an inner yoke and an outer yoke,
 wherein the coil section is disposed between the inner yoke and the outer yoke, and the inner yoke and the outer yoke induce a magnetic force line to pass through the coil section,
 the permanent magnet surrounds the lens section and is configured such that an upper end and a lower end of the permanent magnet have different magnetic poles from each other,
 the inner yoke is fixed to the lower end of the permanent magnet and formed to be bent downward facing the inside of the coil section, and
 the outer yoke is fixed to the upper end of the permanent magnet, formed to be bent to surround the outside of the permanent magnet, and extends downward facing the outside of the coil section.

2. The camera module according to claim 1, further comprising, a terminal extension section configured to electrically extend from a wiring terminal of the coil section to the outside of the camera module.

3. The camera module according to claim 2, further comprising, a head that partially covers an upper end of the outer yoke and a base that partially covers a lower end of the outer yoke, wherein the terminal extension section is partially placed between a concave section between the head and the base.

4. A camera module, comprising:
 a lens section comprising at least one lens;
 a coil section fixed to the lens section and comprising wiring terminals;
 a magnet section generating a magnetic field acting on the coil section;
 a terminal extension section comprising a first terminal and a second terminal,
 wherein the first terminal and second terminal electrically extend from the wiring terminals of the coil section,
 the terminal extension section is formed to surround an outer circumference surface of the magnet section, and
 the first and second terminals are formed on a surface of the terminal extension section to be externally exposed and arranged along the circumference of the magnet section.

5. The camera module according to claim 4, wherein the terminal extension section comprises:
 a ring member electrically connected with the wiring terminals of the coil section; and
 a band member extending from the ring member and surround the magnet section,
 wherein the first terminal and the second terminal are formed along the ring member and the band member.

6. The camera module according to claim 5, wherein the ring member has contact points connected with the wiring terminals of the coil section and is configured such that the first terminal extends from one of the contact points along one half of the ring member, and the second terminal extends from the other of the contact points along the other half of the ring member.

7. The camera module according to claim 6, further comprising, a head that partially covers an upper end of the magnet section and a base that partially covers a lower end of the magnet section, wherein the terminal extension section is partially placed between a concave section between the head and the base.

8. The camera module according to claim 4, wherein the magnet section comprises a permanent magnet, an inner yoke fixed to one of two magnetic poles of the permanent magnet, and an outer yoke fixed to the other of the two magnetic poles of the permanent magnet, wherein the coil section is interposed between the inner yoke and the outer yoke.

9. The camera module according to claim 4, further comprising, a printed circuit board (PCB) having contact points that extend from the PCB to electrically be connected with the first terminal and the second terminal formed in the terminal extension section.

10. A camera module with an autofocus function, comprising:
 a lens section including at least one lens;
 a coil section fixed to the lens section;
 a magnet section disposed such that a magnetic field acts on the coil section and supported by a base;
 a spring disposed between the lens section and the base;
 a holder screw-coupled with the base for precise focus adjustment of the lens section;
 a terminal extension section including a first terminal and a second terminal that are connected with wiring terminals of the coil section, respectively and extends to the outside; and a printed circuit board (PCB) fixed to the holder and having connection terminals that extend to be electrically connected with the first and second terminals, wherein the terminal extension section is formed to surround an outer circumferential surface of the magnet section, and the first and second terminals are formed on a surface of the terminal extension section to be externally exposed and arranged along the circumference of the magnet section.

11. The camera module according to claim 10, wherein the terminal extension section comprises:

a circular ring member disposed above the spring and coupled with the base; and a band member formed integrally with the circular ring member and extending from the circular ring member to the outside and being bendable to surround the outer circumferential surface of the magnet section.

12. The camera module according to claim 11, wherein the band member comprises an adhesive section fixed to the magnet section on a surface opposite to the surface on which the first and second terminals are formed.

13. The camera module according to claim 10, wherein the magnet section comprises:

a permanent magnet of a ring shape surrounding the lens section;

an inner yoke fixed to one of two magnetic poles of the permanent magnet and disposed inside the coil section; and an outer yoke fixed to the other of the two magnetic poles of the permanent magnet and disposed outside the coil section, wherein the terminal extension section is fixed to an outer circumferential surface of the outer yoke.

14. The camera module according to claim 13, further comprising, a head disposed above the outer yoke to partially cover the outer circumferential surface of the outer yoke, wherein the base partially covers the outer circumferential surface of the outer yoke below the outer yoke and is apart from the head, and the terminal extension section is placed on a concave section between the head and the base.

15. The camera module according to claim 13, wherein the outer yoke is fixed to an upper end of the permanent magnet, is bent facing the outside of the coil section while surrounding the outside of the permanent magnet, and is fixed to the base, and the inner yoke is fixed to a lower end of the permanent magnet and bent facing the inside of the coil section.

* * * * *